(12) United States Patent
De Souza et al.

(10) Patent No.: US 12,164,411 B2
(45) Date of Patent: Dec. 10, 2024

(54) AUTOMATED DISTRIBUTED COMPUTING TEST EXECUTION

(71) Applicant: Fujifilm Medical Systems U.S.A., Inc., Lexington, MA (US)

(72) Inventors: Vitor De Souza, Raleigh, NC (US); Antoine Basquiat, Willow Springs, NC (US); Sebastian Byrum, Leesburg, GA (US)

(73) Assignee: FUJIFILM MEDICAL SYSTEMS U.S.A., INC., Lexington, MA (US)

( * ) Notice: Subject to any disclaimer, the term of this patent is extended or adjusted under 35 U.S.C. 154(b) by 0 days.

(21) Appl. No.: 17/350,671

(22) Filed: Jun. 17, 2021

(65) Prior Publication Data
US 2022/0405189 A1    Dec. 22, 2022

(51) Int. Cl.
| | | |
|---|---|---|
| *G06F 11/36* | (2006.01) | |
| *G06F 9/451* | (2018.01) | |
| *G06F 11/30* | (2006.01) | |
| *G06F 11/32* | (2006.01) | |
| *G06F 11/34* | (2006.01) | |
| *G06F 16/245* | (2019.01) | |

(52) U.S. Cl.
CPC ......... *G06F 11/3604* (2013.01); *G06F 9/451* (2018.02); *G06F 11/3024* (2013.01); *G06F 11/323* (2013.01); *G06F 11/3495* (2013.01); *G06F 11/3624* (2013.01); *G06F 11/3688* (2013.01); *G06F 11/3692* (2013.01); *G06F 16/245* (2019.01)

(58) Field of Classification Search
None
See application file for complete search history.

(56) References Cited

U.S. PATENT DOCUMENTS

| | | | | |
|---|---|---|---|---|
| 6,230,313 | B1 * | 5/2001 | Callahan, II | G06F 11/3664 717/130 |
| 9,679,090 | B1 * | 6/2017 | Marolia | G06F 11/34 |
| 10,515,001 | B2 * | 12/2019 | Ayyappan | G06F 11/3672 |
| 2012/0324281 | A1 * | 12/2012 | Goroff | G06F 11/2215 714/15 |
| 2015/0208258 | A1 * | 7/2015 | Brenzel | H04W 76/10 455/418 |
| 2015/0278076 | A1 * | 10/2015 | BS | G06F 11/3664 714/38.1 |
| 2018/0322036 | A1 * | 11/2018 | Alam | G06F 11/3604 |
| 2020/0341888 | A1 * | 10/2020 | Sridhar | G06F 11/3692 |
| 2022/0058112 | A1 * | 2/2022 | Lim | G06F 11/3684 |
| 2022/0350733 | A1 * | 11/2022 | Vasavan | G06F 11/3692 |

* cited by examiner

*Primary Examiner* — Lewis A Bullock, Jr.
*Assistant Examiner* — Mark A Gooray
(74) *Attorney, Agent, or Firm* — Baker Botts L.L.P.

(57) ABSTRACT

In computer-implemented method, computer system, and/or computer program product, a processor(s) obtains a test (of steps(s)) to verify program code for deployment in distributed computing system. The processor(s) determines pre-defined operations correlating to the step(s). The processor(s) automatically distributes the pre-defined operations to a resources of a distributed computing system, for execution. The processor(s) monitors the execution and saves at least one screenshot as each step. The processor(s) generates a user interface with a status indicator. The processor(s) continuously update the user interface, based on the monitoring, to reflect a progression of the portion of the one or more resources through the step(s).

17 Claims, 10 Drawing Sheets

310
| Server | vCenter | Windows | Misc |
Server: v700jaqatest01
Domain: sysk8local
Browser: Browser A ▽

320
| Server | vCenter | Windows | Misc |
Address: vcenter-mv2.fmsuz.com
Username: fmsuz\user
Password: *****

330
| Server | vCenter | Windows | Misc |
Username: administrator
Password: ********

340
| Server | vCenter | Windows | Misc |
Execute: 1 time(s)
☐ Stop on error  ☑ Take screenshots
Screenshots path: C:\temp\SynapseAu

400

| [INFO]  | [Default] 4/9/2021 8:05:09 AM Getting text - SELECTOR: "div[class*='itemRow']:eq(1) div[class*='itemCell']:eq(18) span[class ='dataValue']:eq(0)' CONTEXT: html |
| ------- | --- |
| [INFO]  | [Default] 4/9/2021 8:05:09 AM WaitUnitElemetIsInPage - SELECTOR: "div[class*='itemRow']:eq(1) div[class*='itemCell']:eq(18) span[class ='dataValue']:eq(0)' CONTEXT: html |
| [INFO]  | [Default] 4/9/2021 8:05:09 AM WaitUnitElemetIsInPage: TRUE |
| [INFO]  | [Default] 4/9/2021 8:05:09 AM Element's text: CT |
| [DEBUG] | [Method start/end] 4/9/2021 8:05:09 AM IsAsExpected method - start |
| [INFO]  | [Default] 4/9/2021 8:05:09 AM EXPECTED: 'CT' | ACTUAL: 'CT' |
| [INFO]  | [Step result] 4/9/2021 8:05:09 AM PASSED |
| [DEBUG] | [Method start/end] 4/9/2021 8:05:09 AM CheckHTTPErrors - START |
| [INFO]  | [Default] 4/9/2021 8:05:09 AM document title: 'Worklist - Browser A' |
| [DEBUG] | [Method start/end] 4/9/2021 8:05:09 AM CheckHTTPErrors - END |
| [DEBUG] | [Method start/end] 4/9/2021 8:05:09 AM CatchErrors - START |
| [DEBUG] | [Method start/end] 4/9/2021 8:05:09 AM IsAsExpected method - start |
| [INFO]  | [Default] 4/9/2021 8:05:09 AM EXPECTED: '<\*CONTAINS\* >Browser B' | ACTUAL: 'Browser A' |
| [DEBUG] | [Method start/end] 4/9/2021 8:05:09 AM CatchErrors - END |
| [DEBUG] | [Method start/end] 4/9/2021 8:05:09 AM GetCurrentPageName method START |
| [DEBUG] | [Method start/end] 4/9/2021 8:05:09 AM Getting URL... |
| [INFO]  | [Default] 4/9/2021 8:05:09 AM Page URL: http://lv710qatest02.sysk.8.local/WorkflowUI/?path=8dcmdebug=true |
| [DEBUG] | [Default] 4/9/2021 8:05:09 AM PageName: 'worklist' PathURL: 'workflowui' DefaultView: " WebDriver: 'Worklist - Browser A' |
| [DEBUG] | [Default] 4/9/2021 8:05:09 AM GetCurrentPageName method END |
| [DEBUG] | [Default] 4/9/2021 8:05:09 AM Screenshot Taken: 39_2 |
| [WARN]  | [Default] 4/9/2021 8:05:09 AM Synapse Error not found in active window |
| [DEBUG] | [Method start/end] 4/9/2021 8:05:09 AM CatchWarnings - END |
| [DEBUG] | [Step start/end] 4/9/2021 8:05:09 AM Step 'Verify page's HTML element's inner text - (div[class*='itemRow']:eq(1) div[class*='itemCell']:eq({!ModalityIndex})) span[class='dataValue']=CT)' ended |
| [DEBUG] | [Step start/end] 4/9/2021 8:05:09 AM Step Duration: 00:00:00.9738328 |
| [INFO]  | [Step result] 4/9/2021 8:05:09 AM Passed |
| [DEBUG] | [Database Interaction] 4/9/2021 8:05:09 AM Step posted. Response: 17079 - - - 332566 - - - 30236165 - - - POSTED! |

⊘ 40. Verify page's HTML element's inner text(div[class*='itemRow']:eq(1) div[class*='itemCell']:eq(19) span[class='dataValue']=13)
⊘ 41. Verify page's HTML element's inner text(div[class*='itemRow']:eq(1) div[class*='itemCell']:eq(16) span[class='dataValue']=CT_CT_ABDOMEN)

FIG. 4

AUTOMATED DISTRIBUTED COMPUTING TEST EXECUTION

BACKGROUND OF INVENTION

Regression testing, which verifies that recent code changes have not adversely impacted already existing functionality of a system, of core information technology systems, including, but not limited to, those used in healthcare facilities, is time consuming and largely manual. The manual nature of regression testing can be both time-consuming as well as prone to the introduction of human error. A type of regression testing is smoke testing (also referred to as confidence testing, sanity testing, build verification testing (BVT), and build acceptance testing), which reveals simple failures severe enough to, for example, reject a prospective software release. In certain technical environments where new software builds are released on an aggressive schedule, performing smoke tests can dominate resources and labor in the computing environment for long periods of time, which can impact the scheduled build deployments. Smoke tests involve the execution of test cases that cover the most important functionality of a component or system, used to aid assessment of whether main functions of the software appear to work correctly. When the software system is complex and/or deployed throughout a distributed computing system with disparate resources, the amount of test cases and manual computing work utilized just to achieve the preliminary level of assurance of a smoke test can greatly impact the efficiency of the system and the ability to deploy new builds, as needed, to the users of the system.

SUMMARY OF INVENTION

Shortcomings of the prior art can be overcome and benefits as described later in this disclosure can be achieved through the provision of a method to automatically execute a test of software in a distributed computing environment. Various examples of the method are described below, and the method, including and excluding the additional examples enumerated below, in any combination (provided these combinations are not inconsistent), overcome these shortcomings. The method includes: obtaining, by one or more processors, a test to verify program code for deployment to one or more resources of a distributed computing system, wherein the test comprises one or more steps; determining, by the one or more processors, based on comparing the one or more steps to pre-defined operations saved on at least one resource of the distributed computing system, one or more pre-defined operations correlating to the one or more steps; automatically distributing, by the one or more processors, the identified one or more pre-defined operations to a portion of the one or more resources of the distributed computing system, for execution on the portion of the one or more resources; monitoring, by the one or more processors, the execution of the identified one or more pre-defined operations on the portion of the one or more resources, wherein the monitoring comprises taking and saving at least one screenshot as each step of the one or more steps is executed by at least one resource of the portion of the one or more resources; generating, by the one or more processors, a user interface, wherein the user interface comprises a status indicator and a list of the one or more steps; and continuously updating, by the one or more processors, the user interface, based on the monitoring, to reflect a progression of the portion of the one or more resources through the one or more steps.

In some examples, the continuously updating further comprises: indicating, by the one or more processors, in the user interface, a pass or a fail for each step of the one or more steps.

In some examples, the method further comprises generating the user interface comprises: displaying, by the one or more processors, the progression of the portion of the one or more resources through the one or more steps in a web browser.

In some examples, the method further comprises: generating, by the one or more processors, a log file, based on monitoring the execution of the identified one or more pre-defined operations on the portion of the one or more resources; and storing, by the one or more processors, the log file in a memory resource.

In some examples, the method further comprises: obtaining, by the one or more processors, via the user interface, a user selection of at least one item on the list of the one or more steps; based on the user selection, querying, by the one or more processors, the database to access portions of the log file relevant to the user selection; and updating, by the one or more processors, the user interface, to reflect the portion of the log file relevant to the user selection.

In some examples, the portion of the log file relevant to the user selection is selected from the group consisting of: results of executing at least one of the one or more pre-defined operations, a screenshot, and a graph illustrating performance of at least one resource of the distributed computing system.

In some examples, the method further comprises: obtaining, by the one or more processors, via the user interface, a user selection of at least one item on the list of the one or more steps; and opening, by the one or more processors, in a debugger, a portion the program code, based on the user selection.

In some examples, the method further comprises: determining, by the one or more processors, that the test is complete; transmitting, by the one or more processors, a file comprising test results of the test to a pre-defined distribution list, wherein the test results comprise one or more of the screenshots.

In some examples, the test comprises obtaining an item from the group consisting of: a pending automated test, and a valid automated test.

In some examples, the user interface further comprises status information for workstations and servers executing one or more pre-define operations of the identified one or more pre-defined operations.

In some examples, the status information for the workstations and the servers comprises performance values for random-access memories and central processing units comprising the workstations and the servers.

In some examples, the method further comprises, the file comprising test results comprises items from the test selected from the group consisting of: a scenario number, a unique resource identifier, iterations of a given step planned, iterations of the given step completed, a memory issue, a CPU issue, a disk issue, a software issue, and a hypertext link to the user interface.

Shortcomings of the prior art can be overcome and benefits as described later in this disclosure can be achieved through the provision of a system to automatically test a software program. Various examples of the system are described below, and the system, including and excluding the additional examples enumerated below, in any combination (provided these combinations are not inconsistent), overcome these shortcomings. The system includes: a memory; one or more processors in communication with the memory; program instructions executable by the one or more processors via the memory to perform a method, the method including: obtaining, by the one or more processors, a test to verify program code for deployment to one or more resources of a distributed computing system, wherein the test comprises one or more steps; determining, by the one or more processors, based on comparing the one or more steps to pre-defined operations saved on at least one resource of the distributed computing system, one or more pre-defined operations correlating to the one or more steps; automatically distributing, by the one or more processors, the identified one or more pre-defined operations to a portion of the one or more resources of the distributed computing system, for execution on the portion of the one or more resources; monitoring, by the one or more processors, the execution of the identified one or more pre-defined operations on the portion of the one or more resources, wherein the monitoring comprises taking and saving at least one screenshot as each step of the one or more steps is executed by at least one resource of the portion of the one or more resources; generating, by the one or more processors, a user interface, wherein the user interface comprises a status indicator and a list of the one or more steps; and continuously updating, by the one or more processors, the user interface, based on the monitoring, to reflect a progression of the portion of the one or more resources through the one or more steps.

In some examples of the system, the continuously updating further comprises: indicating, by the one or more processors, in the user interface, a pass or a fail for each step of the one or more steps.

In some examples of the system, the method further comprises generating the user interface comprises: displaying, by the one or more processors, the progression of the portion of the one or more resources through the one or more steps in a web browser.

In some examples of the system, the method further comprises: generating, by the one or more processors, a log file, based on monitoring the execution of the identified one or more pre-defined operations on the portion of the one or more resources; and storing, by the one or more processors, the log file in a memory resource.

In some examples of the system, the method further comprises: obtaining, by the one or more processors, via the user interface, a user selection of at least one item on the list of the one or more steps; based on the user selection, querying, by the one or more processors, the database to access portions of the log file relevant to the user selection; and updating, by the one or more processors, the user interface, to reflect the portion of the log file relevant to the user selection.

In some examples of the system, the portion of the log file relevant to the user selection is selected from the group consisting of: results of executing at least one of the one or more pre-defined operations, a screenshot, and a graph illustrating performance of at least one resource of the distributed computing system.

In some examples of the system, the method further comprises: obtaining, by the one or more processors, via the user interface, a user selection of at least one item on the list of the one or more steps; and opening, by the one or more processors, in a debugger, a portion the program code, based on the user selection.

In some examples of the system, the method further comprises: determining, by the one or more processors, that the test is complete; transmitting, by the one or more processors, a file comprising test results of the test to a pre-defined distribution list, wherein the test results comprise one or more of the screenshots.

In some examples of the system, the test comprises obtaining an item from the group consisting of: a pending automated test, and a valid automated test.

In some examples of the system, the user interface further comprises status information for workstations and servers executing one or more pre-define operations of the identified one or more pre-defined operations.

In some examples of the system, the status information for the workstations and the servers comprises performance values for random-access memories and central processing units comprising the workstations and the servers.

In some examples of the system, the method further comprises, the file comprising test results comprises items from the test selected from the group consisting of: a scenario number, a unique resource identifier, iterations of a given step planned, iterations of the given step completed, a memory issue, a CPU issue, a disk issue, a software issue, and a hypertext link to the user interface.

Shortcomings of the prior art can be overcome and benefits as described later in this disclosure can be achieved through the provision of a computer program product for automatically testing a program code. Various examples of the computer program product are described below, and the computer program product, including and excluding the additional examples enumerated below, in any combination (provided these combinations are not inconsistent), overcome these shortcomings. The computer program product includes: a computer readable storage medium readable by one or more processors and storing instructions for execution by the one or more processors for performing a method comprising: obtaining, by the one or more processors, a test to verify program code for deployment to one or more resources of a distributed computing system, wherein the test comprises one or more steps; determining, by the one or more processors, based on comparing the one or more steps to pre-defined operations saved on at least one resource of the distributed computing system, one or more pre-defined operations correlating to the one or more steps; automatically distributing, by the one or more processors, the identified one or more pre-defined operations to a portion of the one or more resources of the distributed computing system, for execution on the portion of the one or more resources; monitoring, by the one or more processors, the execution of the identified one or more pre-defined operations on the portion of the one or more resources, wherein the monitoring comprises taking and saving at least one screenshot as each step of the one or more steps is executed by at least one resource of the portion of the one or more resources; generating, by the one or more processors, a user interface, wherein the user interface comprises a status indicator and a list of the one or more steps; and continuously updating, by the one or more processors, the user interface, based on the monitoring, to reflect a progression of the portion of the one or more resources through the one or more steps.

In some examples of the computer program product, the continuously updating further comprises: indicating, by the one or more processors, in the user interface, a pass or a fail for each step of the one or more steps.

In some examples of the computer program product, the method further comprises generating the user interface comprises: displaying, by the one or more processors, the progression of the portion of the one or more resources through the one or more steps in a web browser.

In some examples of the computer program product, the method further comprises: generating, by the one or more processors, a log file, based on monitoring the execution of the identified one or more pre-defined operations on the portion of the one or more resources; and storing, by the one or more processors, the log file in a memory resource.

In some examples of the computer program product, the method further comprises: obtaining, by the one or more processors, via the user interface, a user selection of at least one item on the list of the one or more steps; based on the user selection, querying, by the one or more processors, the database to access portions of the log file relevant to the user selection; and updating, by the one or more processors, the user interface, to reflect the portion of the log file relevant to the user selection.

In some examples of the computer program product, the portion of the log file relevant to the user selection is selected from the group consisting of: results of executing at least one of the one or more pre-defined operations, a screenshot, and a graph illustrating performance of at least one resource of the distributed computing system.

In some examples of the computer program product, the method further comprises: obtaining, by the one or more processors, via the user interface, a user selection of at least one item on the list of the one or more steps; and opening, by the one or more processors, in a debugger, a portion the program code, based on the user selection.

In some examples of the computer program product, the method further comprises: determining, by the one or more processors, that the test is complete; transmitting, by the one or more processors, a file comprising test results of the test to a pre-defined distribution list, wherein the test results comprise one or more of the screenshots.

In some examples of the computer program product, the test comprises obtaining an item from the group consisting of: a pending automated test, and a valid automated test.

In some examples of the computer program product, the user interface further comprises status information for workstations and servers executing one or more pre-define operations of the identified one or more pre-defined operations.

In some examples of the computer program product, the status information for the workstations and the servers comprises performance values for random-access memories and central processing units comprising the workstations and the servers.

In some examples of the computer program product, the method further comprises, the file comprising test results comprises items from the test selected from the group consisting of: a scenario number, a unique resource identifier, iterations of a given step planned, iterations of the given step completed, a memory issue, a CPU issue, a disk issue, a software issue, and a hypertext link to the user interface.

Systems, methods, and computer program products relating to one or more aspects of the technique are also described and may be claimed herein. Further, services relating to one or more aspects of the technique are also described and may be claimed herein.

Additional features are realized through the techniques described herein. Other examples and aspects are described in detail herein and are considered a part of the claimed aspects. These and other objects, features and advantages of this disclosure will become apparent from the following detailed description of the various aspects of the disclosure taken in conjunction with the accompanying drawings.

It should be appreciated that all combinations of the foregoing aspects and additional concepts discussed in greater detail below (provided such concepts are not mutually inconsistent) are contemplated as being part of the inventive subject matter and to achieve the advantages disclosed herein.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

FIG. 3 depicts aspects of a user interface generated and updated by the program code in various embodiments of the present invention.

FIG. 4 depicts a log file generated by program code in various embodiments of the present invention, provided in a user interface by program code in various embodiments of the present invention.

DETAILED DESCRIPTION OF THE INVENTION

Figure 1:
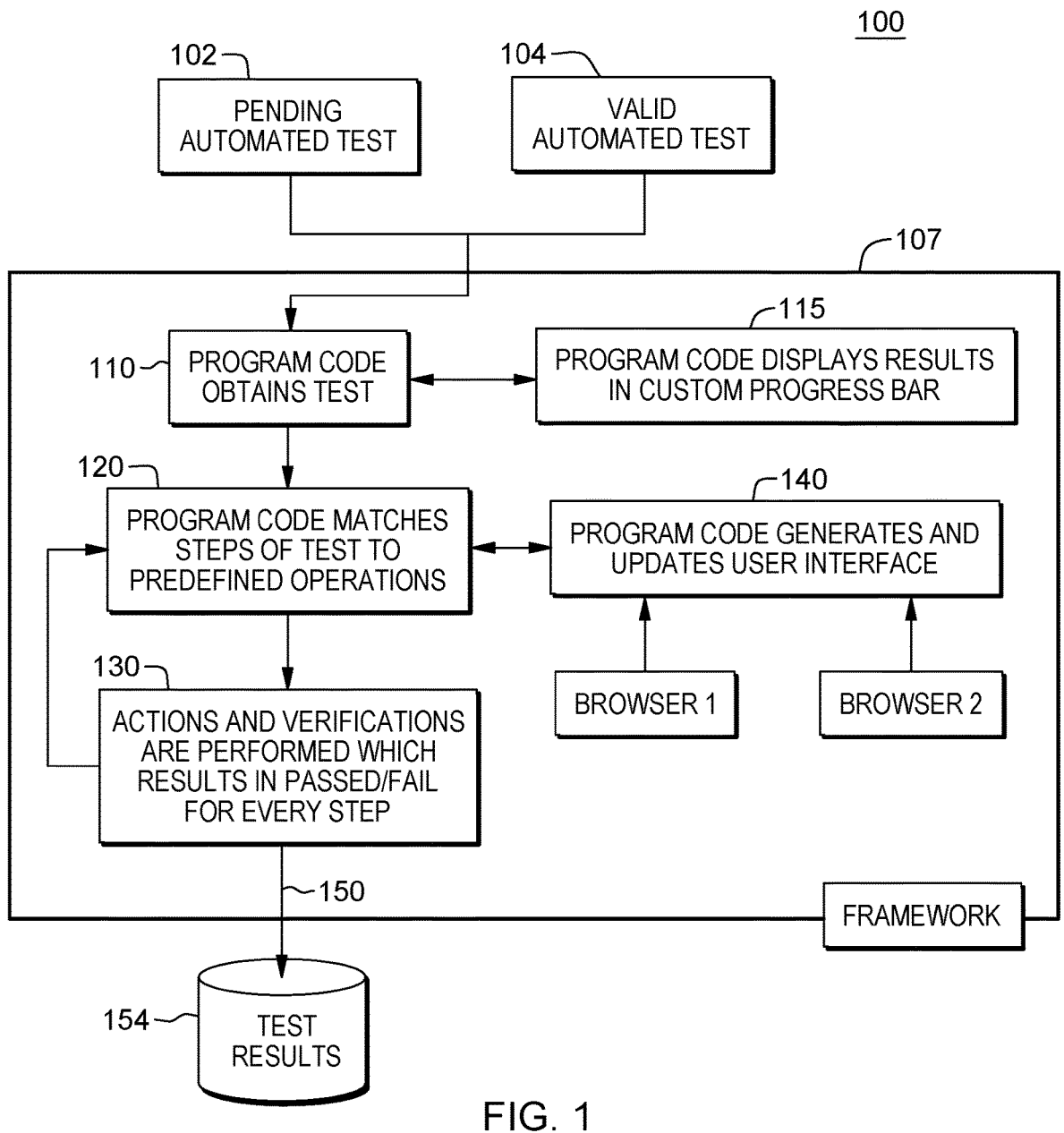
FIG. 1 is a workflow that depicts various aspects of some embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics processor unit). Additionally, items denoted as processors may include hardware and/or software processors or other processing means, including but not limited to a software defined radio and/or custom hardware.

As noted above, as understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code includes a program/utility, having a set (at least one) of program modules, stored in a memory.

Embodiments of the present invention includes computer systems, computer program products, and computer-implemented methods in which program code executed by one or more processors generate and perform testing of code, for deployment, including but not limited to, regression testing, by utilizing automated test cases.

Embodiments of the present invention include an automation tools which, for example, simulates user operations in workstations based on pre-scripted operations. The program code monitors the execution of simulations, collects data, analyzes the data to identify potential issues, and provides the data to administrators in a manner that allows the administrators to drill down into the test results (produced both during and after the testing) to identify potential issues, including but not limited to, memory leaks. As will be discussed in greater detail herein, embodiments of the present invention both mitigate user intervention in regression testing and increase transparency for the user into the now-automated testing. For example, program code executing on one or more processing resources in some embodiments of the present invention can: 1) distribute execution of test cases to available resources of a distributed computing environment (e.g., to enable synchronous and asynchronous execution of test cases and to efficiently perform testing of a build in a limited timeframe); 2) automate execution of test cases; 3) monitor test case execution; 4) generate a user interface to enable a user both to monitor test progression and access, immediately, aspects of the test run(s); 5) enable user access to select portions of the test(s); and 6) via obtaining manual feedback and/or machine learning, improve utilization, execution, and/or distribution of test cases in future tests. Users can access and portions of the test(s) because while automating the distribution and execution of test cases, the program code generates a detailed visualization of interim results in a manner that enables users to immediately access various portions of the tests. The program code also generates and saves a log file comprising the results and saves the log file so that aspects of the log file (results) can be viewed by a user through a user interface (referred to herein also as a visualization). Thus, the program code provides a centralized real-time visualization of the test case executions by various resources in the distributed system. Because of the real-time detailed visualization of the data, the user gains a transparent view of the functionality being performed and can observe that the program code: 1) executes automation test scripts; 2) takes screenshots to assist in the test result validation process; 3) generates a log file containing the results of the test run (which can be utilized both by the program code and by other applications that share a technical environment with the program code, to provide fine-grained access to various aspects of the tests). Specifically, in some examples, the program code generates a graphical user interface (GUI) from which a user can: 1) select the desired tests; 2) run the selected tests from the automated test list(s); and/or 3) verify hypertext transfer protocol (HTTP) traffic requests in a user interface utilized by the program code. Embodiments of the present invention enable the utilization of a single user interface across disparate distributed systems and the user interface, for maximum compatibility with all system in the distributed environment, can be provided, by the program code, in a web browser.

Embodiments of the present invention are inextricably linked to computing at least because aspects of the present invention represent improvements to a process that is unique to a computing environment, specifically, the evaluation (e.g., regression testing, memory testing, smoke testing, etc.) of a build by resources across a distributed computing environment in advance of deploying the build to the resources of the computing environment. Implementing aspects of some embodiments of the present invention in a distributed computing environment improves the functionality of the resources in the environment as a whole at least because automating portions of a highly manual process and providing transparent access to various background processes enables more efficient testing of builds by decreasing the amount of time needed for this testing. Also, the automation and distribution of aspects of the testing allows the resources of the distributed computing system (e.g., enterprise computing system, cloud computing systems, etc.) to be utilized more efficiently such that the testing of the build does not impair other expected functionality. Put plainly, the amount of downtime for the system is minimized. Additionally, as the testing is performed, because of the transparency provided by the program code (e.g., taking screenshots to assist in the test result validation process, generating a log file containing the results of the test run (with indicators to provide fine-grained access to various aspects of the tests, generating a user interface to enable access to fine-grained aspects of the test and resources performing the test, etc.), the process can be improved upon subsequent executions by a user implementing manual updates to test cases and the test scripts informed by the visualized process and results. In some embodiments, the program code can receive automatic feedback and/or feedback on a test and implement automatic updates to the test via machine learning. Thus, both the distribution of the test cases by the program code and the substance of the test cases themselves can be improved in subsequent test runs.

Embodiments of the present invention, in addition to being inextricably tied to computing, also provide a practical application. Current testing procedures for builds over distributed computing systems with heterogeneous resources are time consuming and prone to errors due to the manual nature of the procedures. Automating the execution of test cases alone and leveraging the processing capacity of the system resources, in addition to considering the diversity of the resources in the test, saves significant amounts of time, but embodiments of the present invention also provide transparency into the testing process such that any manual involvement is targeted and well-informed. Also, the transparency provides greater insight into the testing procedures as well as the results. Thus, embodiments of the present invention provide a practical application both by being more efficient at smoke testing and other software testing than existing approaches as by providing an approach to testing that is more intelligent and transparent. The practical applications of embodiments of the present invention are explored in greater detail below, with various practical aspects being explored through specific scenarios.

Embodiments of the present invention provide significant improvements over existing application testing methods. By utilizing aspects of embodiments of the present invention, individuals are provided with a granular view of test results for new builds of applications within a timeframe that was not achievable through existing methods. As aforementioned, embodiments of the present invention leverage the processing power of the distributed system upon which a build will be deployed while providing granular results regarding effects of the execution of the build on various resources. The visualization of the testing, which is available in real-time, can signal administrators to potential memory leaks as well as inefficiencies that are specific to only a few resources across the distributed computing system. In a heterogeneous computing environment, the specificity of the results is particularly valuable as a small issue could potentially be problematic in only a few circumstances and this case may not be realized through previous manual testing procedures. Additionally, aspects of embodiments of the present invention are portable and compatible with various underlying systems as the accessibility provided to the tests and the results by the program code is accomplished utilizing a standard web browser.

FIG. 1 is a workflow 100 that provides an overview of various aspects of the present invention. The figures that follow drill down into more specific functionality provided by various embodiments. However, for ease of understanding, reference is made throughout to various aspects of FIG. 1. A portion of FIG. 1 is labeled a framework 107. The framework 107 outlines elements of the hardware and software environment in which certain embodiments of the present invention execute.

Referring to FIG. 1, in some embodiments of the present invention the program code obtains a pending automated test and/or a valid automated test (110). A collection of one or more steps constitutes a test, hence a pending automated test and/or a valid automated test are each a collection of one or more steps. The test can include test cases, which are pre-defined in a testing script. In some embodiments of the present invention, the test cases are generated by one or more users and can be validated by the program code. The program code may also generate test cases from a test script. For example, a test script can define the features that are to be tested, but the program code, based on obtaining data describing resources of the distributed system when its being tested for compatibility with the software being tested, can enhance the test cases by determining which test cases should be executed on which resources of the distributed system. Test cases comprise tests including one or more of a pending automated test 102 and a valid automated test 104.

Figure 2:
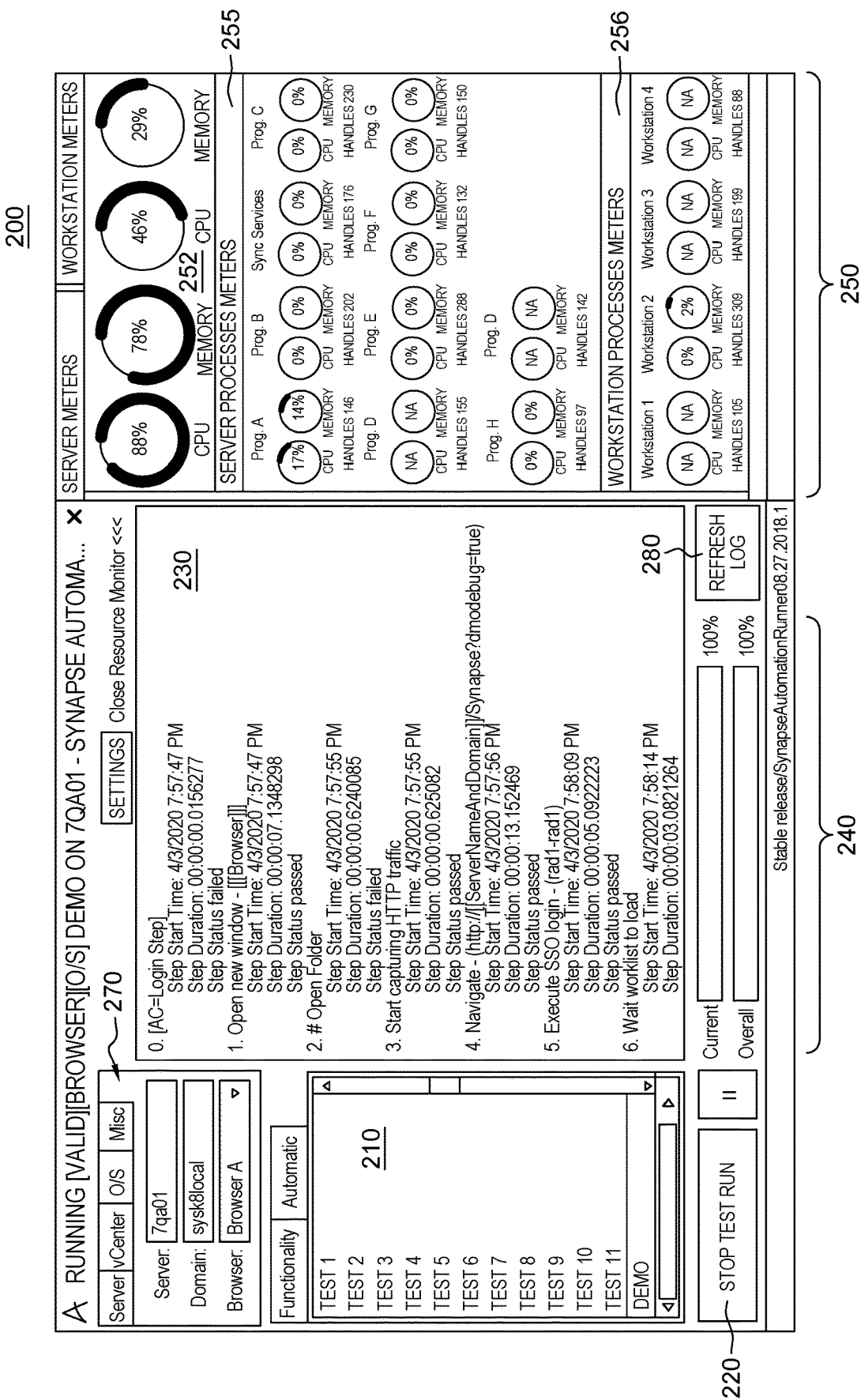
FIG. 2 depicts aspects of a user interface generated and updated by the program code in various embodiments of the present invention.

As illustrated in FIG. 1, in some embodiments of the invention, selection of the tests is viewable to a user, through a user interface 115. As will be depicted in FIG. 2, the pending automated test and/or a valid automated test can be obtained based on a user selecting the test through a user interface. Additionally, the user interface displays, during execution of the pending automated test 102 and/or the valid automated test 104, the progress of the execution of the test. The progress includes various custom progress elements, including but not limited to, a custom progress bar. The program code displays the results, as well as the utilization and health of the resources of the distributed computing system, in a custom progress bar (115). In some embodiments of the present invention, the program code interfaces with existing elements of an operating system (OS) (e.g., Windows) executing on the resources of the computing environment, to generate, display, and/or update, the custom progress bar. FIG. 2 is an example of a user interface 200 generated by the program code, displaying a visualization of test results from a given automated test executed by the program code. This progress bar 240 is illustrated in FIG. 2.

Referring to FIG. 2, on the left of the screen is a selection window 210, from which the user has selected a given test, in this case, the test is called "DEMO." When the user selected the test from the selection window 210, the program code pulls the relevant pending automated test 102 and/or the valid automated test 104 (FIG. 1). A user can stop 220 and/or pause a test run, manually, utilizing controls in the user interface 200. In some embodiments of the present invention, a list of tests to execute is compiled in advance and automatically executed. However, as each test is selected by the program code, the program code can highlight this test in the selection window 210. Functionality tested by a given automated test will vary depending on the software being released. However, certain types of specialized software can include certain specific complexities that are particularly challenging for testing resources in that the functionality itself can be memory and processing intensive. One non-limiting application for embodiments of the present invention is testing software utilized in concert with medical systems. For example, embodiments of the present invention can be utilized to automate testing of software that includes one or more of the following functionalities: 1) sending Digital Imaging and Communications in Medicine (DICOM) data, including sending data for studies; 2) automating interactions with an operating systems, including but not limited to Windows, for utilization of specialized software, including but not limited to PowerScribe; 3) interacting with virtual machines via third party software, including but not limited to Vmware; 4) utilizing low-level commands to execute only mouse & keyboard events; and/or 5) editing and sending Healthcare Information Interface System (HIIS) reports.

In FIG. 2, the center portion 230 of this (non-limiting) example of a user interface 200 generated by the program code to visualize the test and its results to the user is a list of steps comprising the selected test, monitored as executed by the resources of the distributed system to which the program code distributed the operations for execution. Returning momentarily to FIG. 1, the program code matches the one or more steps comprising the pending automated test 102 and/or a valid automated test 104 to pre-defined operations (120). The steps are understandable to the user and the operations is the behind-the-scenes functionality executed by the program code to execute the steps. To execute a given test (i.e., a collection of steps), the program code determines which automated actions comprise the test. The program code obtains user-defined instructions for a test (e.g., steps) and translates the instructions into these automated actions, which can also be understood as operations. In some embodiments of the present invention, the program code interprets user-defined instructions into actions (the steps which will comprise a test), and matches all actions comprising the pending automated test 102 and/or the valid automated test 104 to automated actions stored in a library accessible to the program code (not pictured). The program code executes the test by executing the automated actions or operations. Because the program code interprets instructions into actions and obtains the program code to execute the actions from a library, a pending automated test 102 and/or a valid automated test 104 can be generated by a user without the user understanding the distributed system or its resources. The user can create a script with directions to test a given functionality and the program code will interpret this direction into one or more actions and obtain the code (objects, routines, variables, etc.) from the library to execute these one or more actions, from the library. In some embodiments of the present invention, the program code can update the library of automated actions (operations) based on the results of running various use cases. In some embodiments of the present invention, if the program code is unable to convert an instruction into an automated element or operation from the library, the program code can direct the user to locate and/or enter elements allowing this instruction to be automated (and added to the library for future use).

As discussed above, in some embodiments, the program code can receive automatic feedback and/or feedback on a test and implement automatic updates to the test via machine learning. Therefore, both the distribution of the test cases by the program code and the substance of the test cases themselves can be improved in subsequent test runs. In these embodiments, the program code can solicit and/or obtain feedback via the user interface generated by the program code. The program code can also automatically obtain feedback from the test results generated. Based on obtaining feedback, utilizing one or more of supervised and/or unsupervised machine learning, the program code can implement and/or suggest implementation of changes to future runs of a given test.

As illustrated in FIGS. 1-2, the program code executes the pre-defined operations (FIG. 1, 130; FIG. 2, 230). As discussed above, in executing a test, the program code distributes the various operations over various available resources on a distributed system (to which the build being tested, if verified, will be ultimately deployed). Thus, various operations comprising the operations can be performed in parallel as well as across varied resources in the system. As part of executing each operation (automated action), the program code performs the actions and verifications such that the program code can generate a pass or fail result for each step of the test (130). As illustrated in FIG. 1, the program code matches the one or more steps comprising the pending automated test 102 and/or a valid automated test 104 to pre-defined operations (120) and the program code executing the pre-defined operations to generate a pass or fail for each step of the test (130), can be performed by the program code in an iterative process. Thus, even if certain steps of the test fail on certain resources of the distributed computing system, the test can continue to execute to provide a user with full results from all steps. As illustrated in FIG. 2, the program code can provide the user with the timing for each step, in a given test run, as well as the status of the operation or step, during the test run. As discussed earlier, the overall progress of the test is displayed by the program code as a progress bar 240.

As discussed above, an advantage of embodiments of the present invention is the transparency that the visualizations that the program code provides to the user. Specifically, as illustrated in FIG. 1, the program code utilizes existing tools that are part of a framework of a web browser to interact with the browser(s), so the program code can generate and update a user interface (140). The program code populates the user interface with the pass or fail for each step of the test (e.g., FIG. 2, 230), in addition to providing more granular information. As illustrated in FIG. 2, the program code displays the visualization of the test steps as the pre-defined operations from the database which comprise each test (e.g., FIG. 2, 230). The program code also monitors the resources executing the operations in each test and provides a visualization of the resources to the user so that the user can examine any adverse impacts of the test of the expected functionality of a resource. For example, the program code can generate a visual that could alert a user to a memory leak. FIG. 2 provides an example of a visualization of the monitoring of the resources of the distributed system by the program code. The resources monitoring panels 250 of FIG. 2 provide insight into the operation of various example resources in a distributed system, including but not limited to servers and workstations, including providing both an overview 252 and more detailed panes, such as a pane of server processes meters 255, and a pane of workstation processes meters 256. As the test executes, the program code can learn about the viability of each operation and its effects on the distributed system and generate test results for a particular case. Thus, in some embodiments of the present invention, the program code can revise certain of the operations based on monitoring their execution (e.g., for efficiency, etc.), based on manual feedback and, in some embodiments, machine learning. Another portion of the transparency into the build being tested via the test is the screenshots which the program code automatically takes while the program code executes the test. In some examples, the program code takes a video or a series of images of the test execution and retains relevant snapshots from the video.

Aspects of the computing system upon which the test cases are executed and some functionalities of the tests themselves can be configured via the user interface 200. Various settings 270 of the testing can be configured via various panes 270, including, in this example, Server, vCenter, Windows, and Misc. Each of these panes 270 is shown, individually, in FIG. 3. A user enters credentials to the server 310, URL at which to view the results (e.g., under interface) 320, and operating system 330, into these panes 300, 270 (FIG. 3, FIG. 2). Additionally, aspects of the screenshot functionality can be configured by the user through the miscellaneous pane 340. For ease of understanding, these windows are grouped together, but in various embodiments of the present invention, they can be tabbed into separate views by the program code.

As aforementioned, an advantage of various embodiments of the present invention is the compatibility of the visualizations (by the program code) with various distributed architectures. As illustrated in FIG. 1, to generate the visualizations, the program code leverages built-in communication handlers for various web browsers (e.g., Web Sockets for Chrome and Edge, COM objects for Internet Explorer, etc.). The program code can simultaneously render visualizations in various web browsers utilized by different users, so that the users can collaborate to address any perceived issues in the build identified during the test and displayed in the browsers.

Returning to FIG. 1, as the program code executes the operations, the program code stores intermittent test results in at least one database 154 (150). In some embodiments of the present invention, the test results comprise a log file generated by the program code and stored in at least one database 154. Turning to FIG. 2, as discussed herein, although in some embodiments of the present invention, the log is generated by the program code simultaneously with the execution of the test by the program code, in some embodiments of the present invention, the user can request a refresh 280 of the log file through the user interface 200. FIG. 4 is an example of a log file 400 generated and displayed by the program code in embodiments of the present invention. Utilizing the visualization provided of the log file in FIG. 4, a user can identify the location of issues for further exploration and debugging. As provided by the program code, portions of the steps in the test where no issues were encountered are labeled "info," while certain portions are labeled "debug" and "warn" to draw the user's attention to issues encountered in the test. A user can follow the information provided in the "debug" link to access the portion of the code being tested in to debug the issue. In this manner, a user can easily locate and address any issue experienced during a given test.

Returning to FIG. 1, in some embodiments of the present invention, the test results, which are stored in the database 154, also include screenshots, which are taken during the automated execution of the steps of the test, which illustrate functionality tested during the test. The web browsers can pull information, directly or indirectly, from this database, when a user drills down into a visualization of the results of the operations executed as part of the test. Thus, as illustrated in FIG. 1, aspects of the illustrated (non-limiting) embodiments of the present invention, mitigates the need for manual regression testing by replacing manual regression test cases with automated test cases, in this example, in part, by obtaining a pending automated test and/or a valid automated test (110) and matching the one or more steps comprising the pending automated test 102 and/or a valid automated test 104 to pre-defined operations (120), and executing the pre-defined operations to generate a pass or fail for each step of the test (130). As part of executing the pre-defined operations, in some embodiments of the present invention, the program code, in addition to executing the automated test scripts, takes screenshots to assist in the test result validation process. As the program code executes the operations, the program code stores intermittent test results in at least one database 154, which can include generating a log file containing the results of the test run (150). These results are viewable to the user through a visualization generated by the program code in a web browser because the program code utilizes existing tools that are part of a framework of a web browser to interact with the browser(s) to generate and update a user interface (140).

Other the visualization and/or user interfaces provided by the program code in FIGS. 2 and 4, the program code, in generating the log and screenshots and storing the information in a database (e.g., FIG. 1, 150, 154), generates data that can be utilized by existing applications in the computing environment. These existing applications can access the data and/or be provided with the data, by the program code, and provide additional visuals of these data. In some embodiments of the present invention, the software and/or hardware in the framework 107 (FIG. 1) includes additional visualization functionality, while in some embodiments of the present invention, the program code provides data generated by aspects of the framework 107 to resources external to the framework 107 (these resources may or may not be under the control of the framework 107 resources). FIGS. 5-8 are visualizations of data generated by the program code which can be generated by resources in the framework 107 and/or outside of the framework 107, depending on the embodiment.

Figure 5:
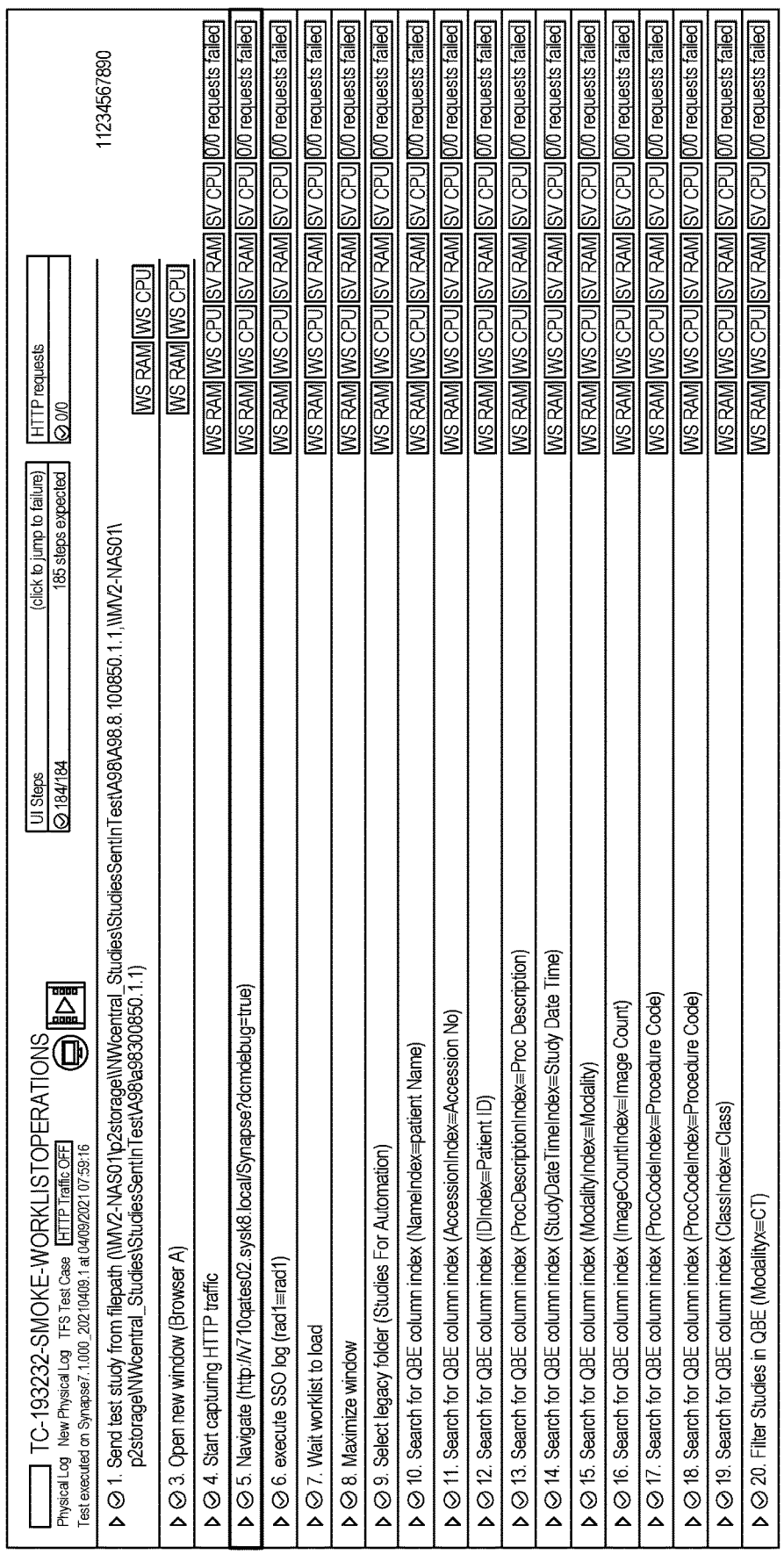
FIG. 5 depicts aspects of a user interface generated and updated by the program code in various embodiments of the present invention.

FIG. 5 is a more detailed view 500 of the user interface of FIG. 2, specifically, the center portion 230, in which the steps of the test are displayed. In FIG. 5, the test steps are enumerated for a test of a given application. Embodiments of the present invention enable various types of tests of an application, including but not limited to a smoke test and a memory test, but these are both provided, for illustrative purposes only, as non-limiting examples used of. As in FIG. 2, the execution of the steps of the test (which were matched to defined operations by the program code) are enumerated in the interface 500. The steps are numbered and checked off by the program code as having been completed. Each step may be executed multiple times during the smoke test, thus, in the results listed on the line, the number of failed requests is noted. Information regarding the random-access memories (RAMs) and central processing units (CPUs) of the servers and the workstations involved in the execution of each test steps are also noted in the interface 400. Various colors can be utilized to indicate if there are any issues with any of these resources. For example, a yellow coloration of a resource could indicate a caution, green could indicate that the resource was operable, and the test results expected, and white could indicate that a given type of resource is or is not in use for a given step of a test.

Figure 6:
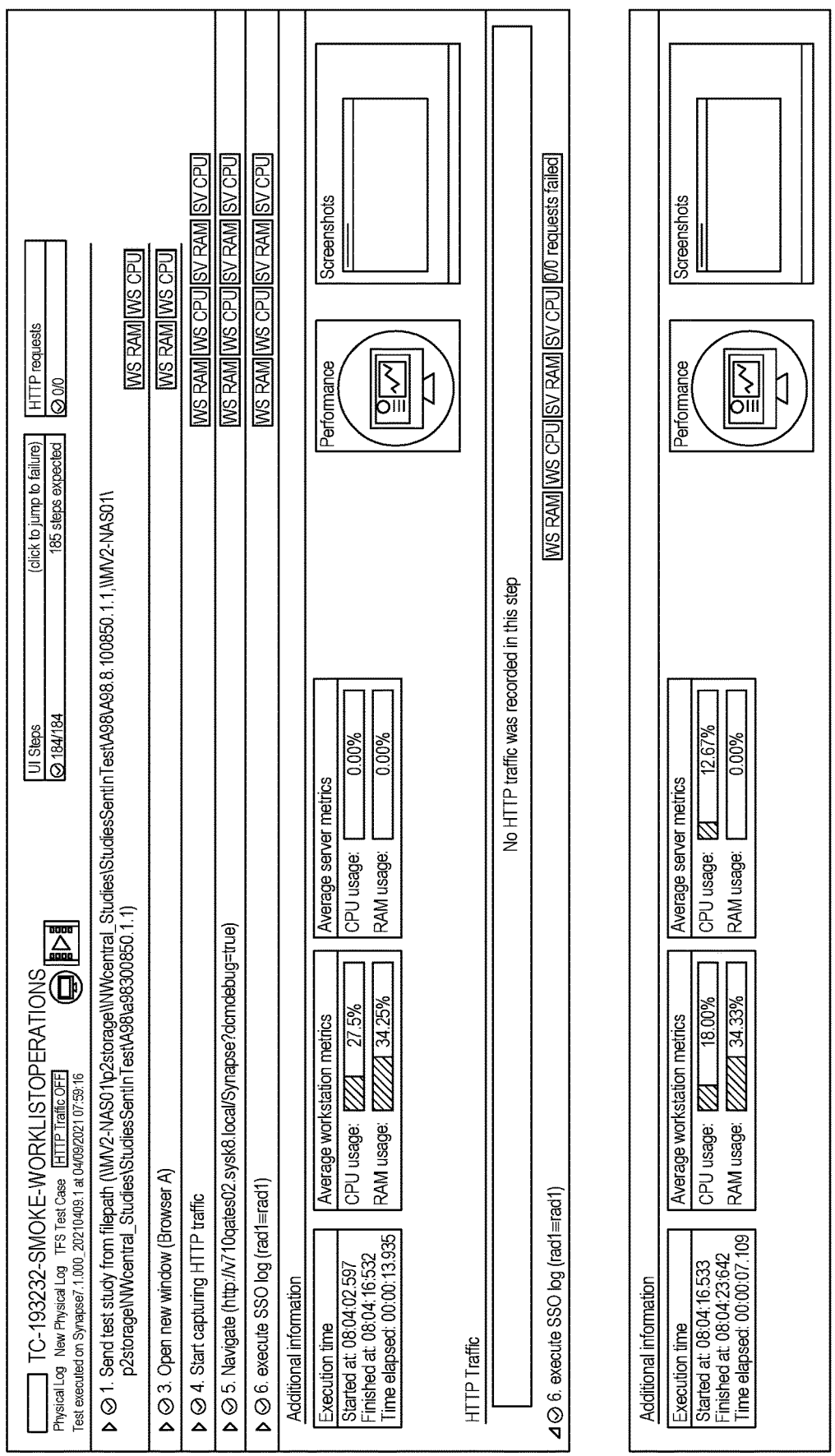
FIG. 6 depicts aspects of a user interface generated and updated by the program code in various embodiments of the present invention.
Figure 7:
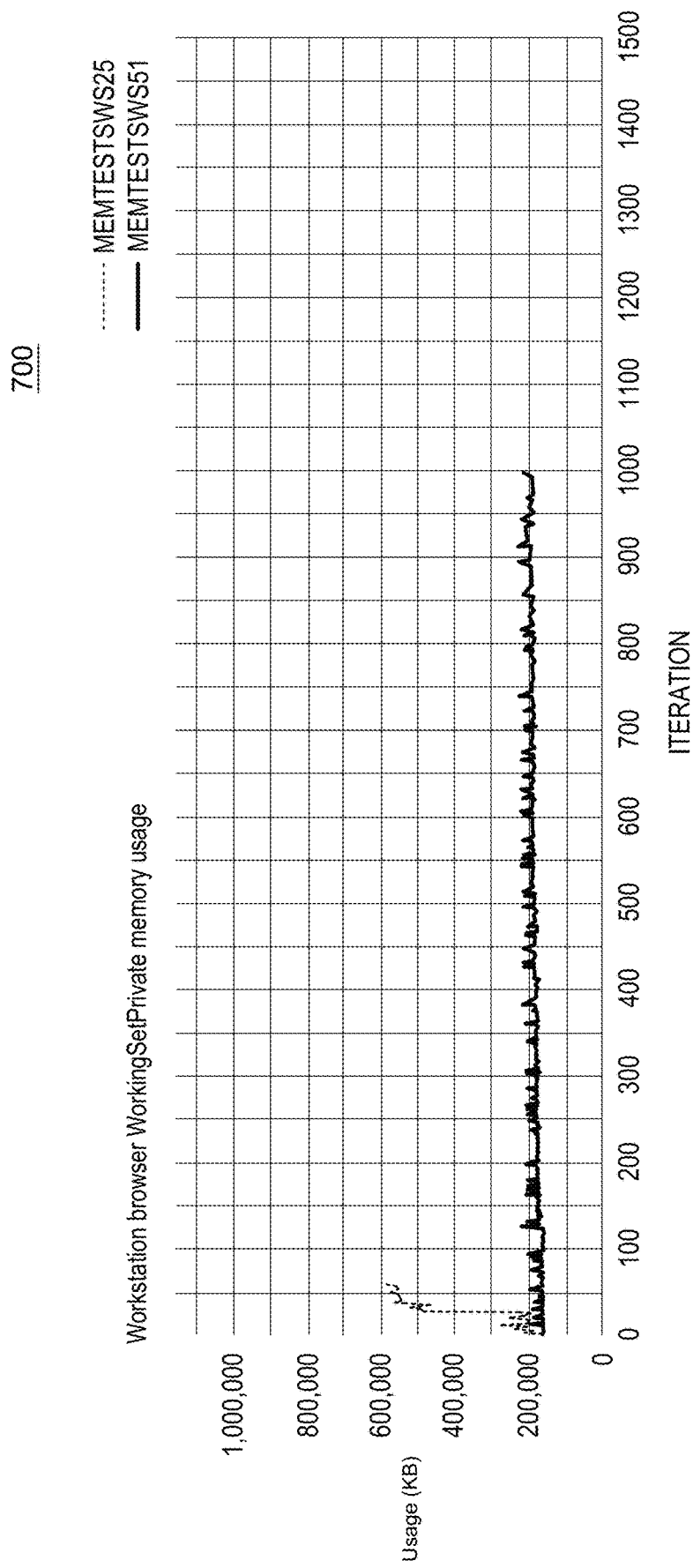
FIG. 7 depicts aspects of a user interface generated and updated by the program code in various embodiments of the present invention.
Figure 8:
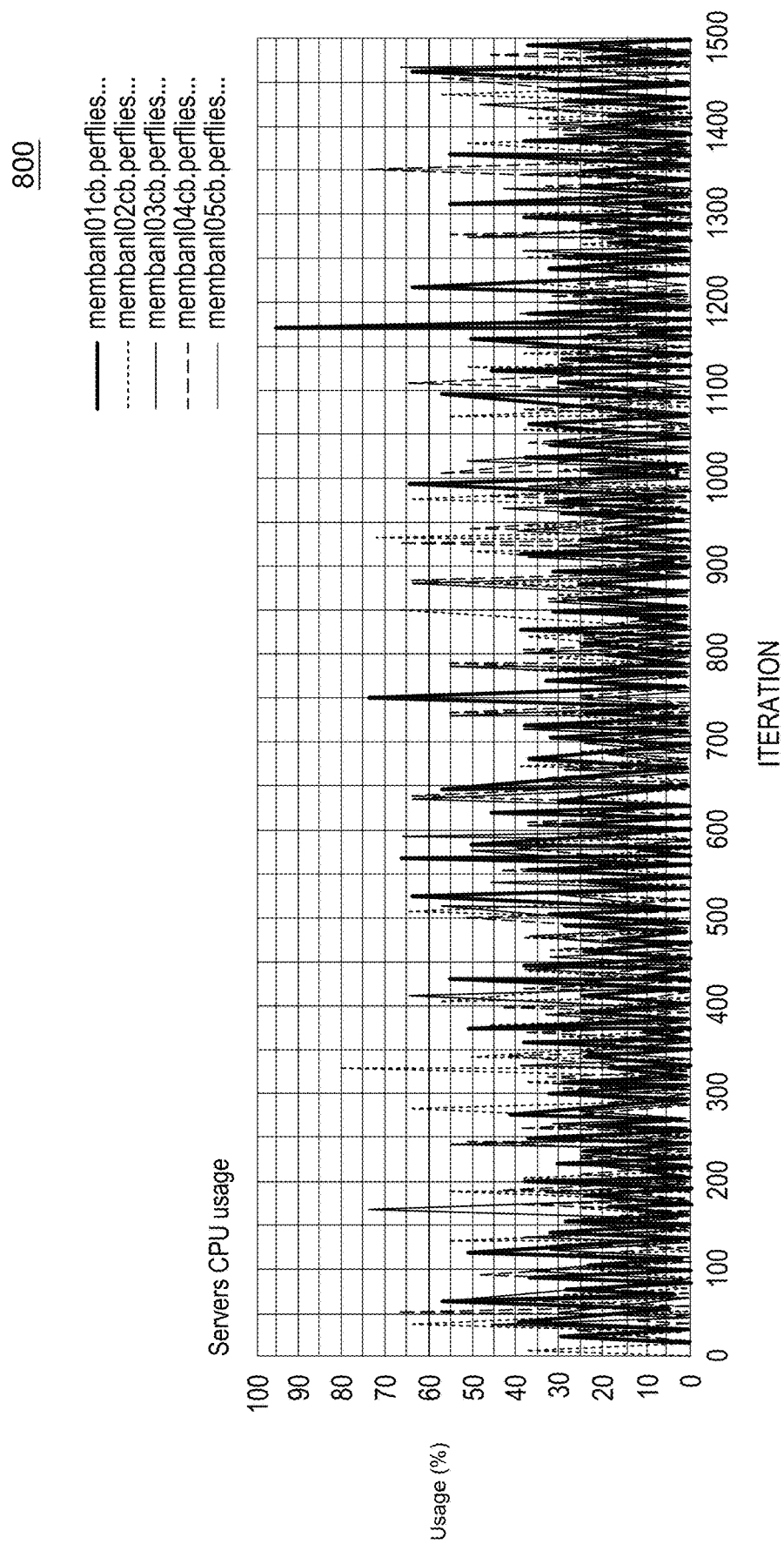
FIG. 8 depicts aspects of a user interface generated and updated by the program code in various embodiments of the present invention.

FIG. 6 depicts a drill-down functionality provided by the program code in the interface 600. For a smoke test example, as seen in FIG. 5, one or more steps are selected by the user. Based on the selection, the program code (either an external application or part of the framework 107 (FIG. 1)) obtains data generated by the program code, including the log file generated by the program code as well as from the screenshots taken by the program code. In FIG. 6, two steps have been selected by a user. For each step, the program code provides a visualization of execution time for the selected step, average workstation metrics during the execution of the step, average server metrics during the execution of the test, a link to a graph of the performance, and at least one screenshot taken during the execution of the automated step by the program code. FIGS. 7-8 are examples of performance charts that provide a user with additional details regarding the execution of various steps at the workstation and server level. In the example of the interface 500, 600 illustrated in FIG. 5-6, selecting the performance icon launches the windows that include these details. FIG. 7 is an example of a performance graph 600 of workstation browser memory usage while FIG. 8 is a performance graph 800 of server CPU usage. The values provided as additional details and the options for performance graphs in this example are just some examples of additional performance information that can be provided by the program code, through the interface, in various embodiments of the present invention.

As aforementioned, embodiments of the present invention provide transparency in testing, which includes fine-grained access to the automated test cases, to enable faster and efficient debugging of any issues that arise during the automated tests. To that end, not only can the program code automatically email or otherwise instantly message detailed results to users, with links directly to relevant aspects of the interface, but also, the program code can provide immediate access to re-run and debug portions of a test.

As noted above, the program code can also notify users of test results via a message, including but not limited to, an email. Parties who are to receive emails or other messages (e.g., SMS) can be configured by a user. The emails or other messages sent to users may include one or more of the following: a list of test or scenarios executed, a list to more detailed information about the scenarios, links to test results, configuration information about the computing resources utilized in the test and/or resources to which the build being testing is to be deployed, s summary of the tests, links to the logs generated by the program code, and/or detailed results for all scenarios. The summary results may include one or more of: scenario number, workstation resources used to execute the test, iterations of the test planned and/or completed (including whether completed automatically or manually), any memory issue (e.g., "memory shot up after a few iterations," "memory leak," etc.), any CPU issue, any disk issue, any other specific software issue (e.g., "from iteration 278 on, the viewer window does not open when clicking Open Viewer from context menu"), any workstation issues (e.g., "Browser crashes after n iterations" (where n is a number), identification of a known bug by a unique identifier, etc.), and notes (e.g., "results for this workstation should in [specified] graph," and other directions to specific test result visualizations for additional information).

Embodiments of the present invention include a computer-implemented method, a computer program product, and a system where program code executing on one or more processors obtains a test to verify program code for deployment to one or more resources of a distributed computing system, where the test comprises one or more steps. The program code determines, based on comparing the one or more steps to pre-defined operations saved on at least one resource of the distributed computing system, one or more pre-defined operations correlating to the one or more steps. The program code automatically distributes the identified one or more pre-defined operations to a portion of the one or more resources of the distributed computing system, for execution on the portion of the one or more resources. The program code monitors the execution of the identified one or more pre-defined operations on the portion of the one or more resources, where the monitoring comprises taking and saving at least one screenshot as each step of the one or more steps is executed by at least one resource of the portion of the one or more resources. The program code generates a user interface, where the user interface comprises a status indicator and a list of the one or more steps. The program code continuously updates the user interface, based on the monitoring, to reflect a progression of the portion of the one or more resources through the one or more steps.

In some examples, the continuously updating by the program code further comprises: the program code indicating in the user interface, a pass or a fail for each step of the one or more steps.

In some examples, the program code generating the user interface comprises: the program code displaying the progression of the portion of the one or more resources through the one or more steps in a web browser.

In some examples, the program code generates a log file, based on monitoring the execution of the identified one or more pre-defined operations on the portion of the one or more resources. The program code stores the log file in a memory resource.

In some embodiments of the present invention, the program code obtains, via the user interface, a user selection of at least one item on the list of the one or more steps. Based on the user selection, the program code queries the database to access portions of the log file relevant to the user selection. The program code updates the user interface to reflect the portion of the log file relevant to the user selection.

In some examples, the portion of the log file relevant to the user selection is selected from the group consisting of: results of executing at least one of the one or more pre-defined operations, a screenshot, and a graph illustrating performance of at least one resource of the distributed computing system.

In some examples, the program code obtains, via the user interface, a user selection of at least one item on the list of the one or more steps. The program code opens a portion the program code, based on the user selection.

In some examples, the program code determines that the test is complete. The program code transmits a file comprising test results of the test to a pre-defined distribution list, where the test results comprise one or more of the screenshots.

In some examples, the test comprises obtaining an item from the group consisting of: a pending automated test, and a valid automated test.

In some examples, the user interface further comprises status information for workstations and servers executing one or more pre-define operations of the identified one or more pre-defined operations.

In some examples, the status information for the workstations and the servers comprises performance values for random-access memories and central processing units comprising the workstations and the servers.

In some examples, the file comprising test results comprises items from the test selected from the group consisting of: a scenario number, a unique resource identifier, iterations of a given step planned, iterations of the given step completed, a memory issue, a CPU issue, a disk issue, a software issue, and a hypertext link to the user interface.

Figure 9:
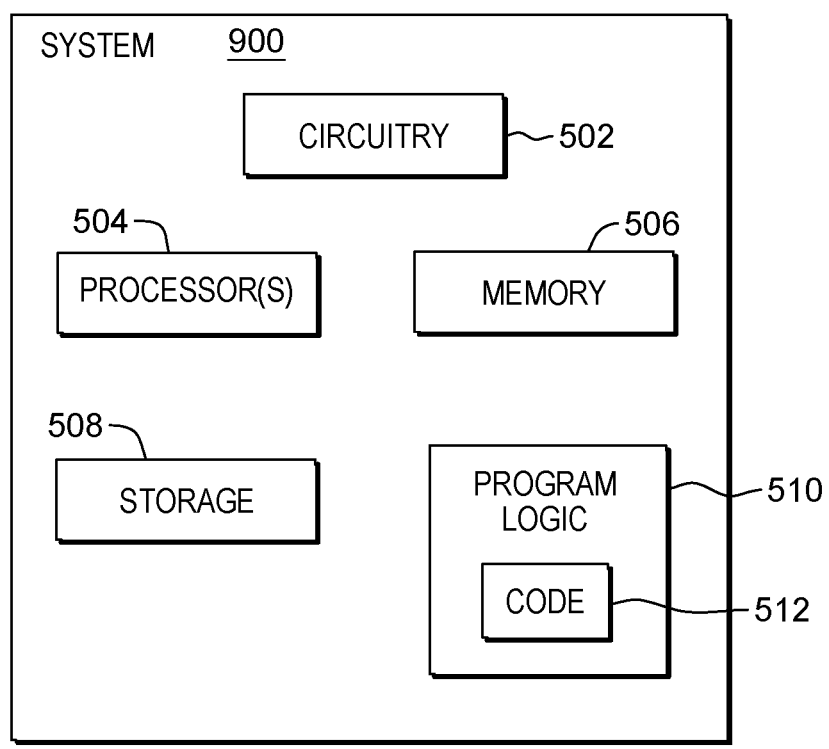
FIG. 9 depicts a computer system configured to perform an aspect of an embodiment of the present invention.

FIG. 9 illustrates a block diagram of a resource 900 in a computer system, such as, which is part of the technical architecture of certain embodiments of the technique. In FIG. 9, the resource 900 may include a circuitry 502 that may in certain embodiments include a microprocessor 504. The computer system 900 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502. This resource 900 can be a single resource in a cloud computing system. As such, the program code discussed herein can be provided as a service or installed to one or more users.

In certain embodiments, the program logic 510 including code 512 may be stored in the storage 508, or memory 506. In certain other embodiments, the program logic 510 may be implemented in the circuitry 502. Therefore, while FIG. 9 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 10:
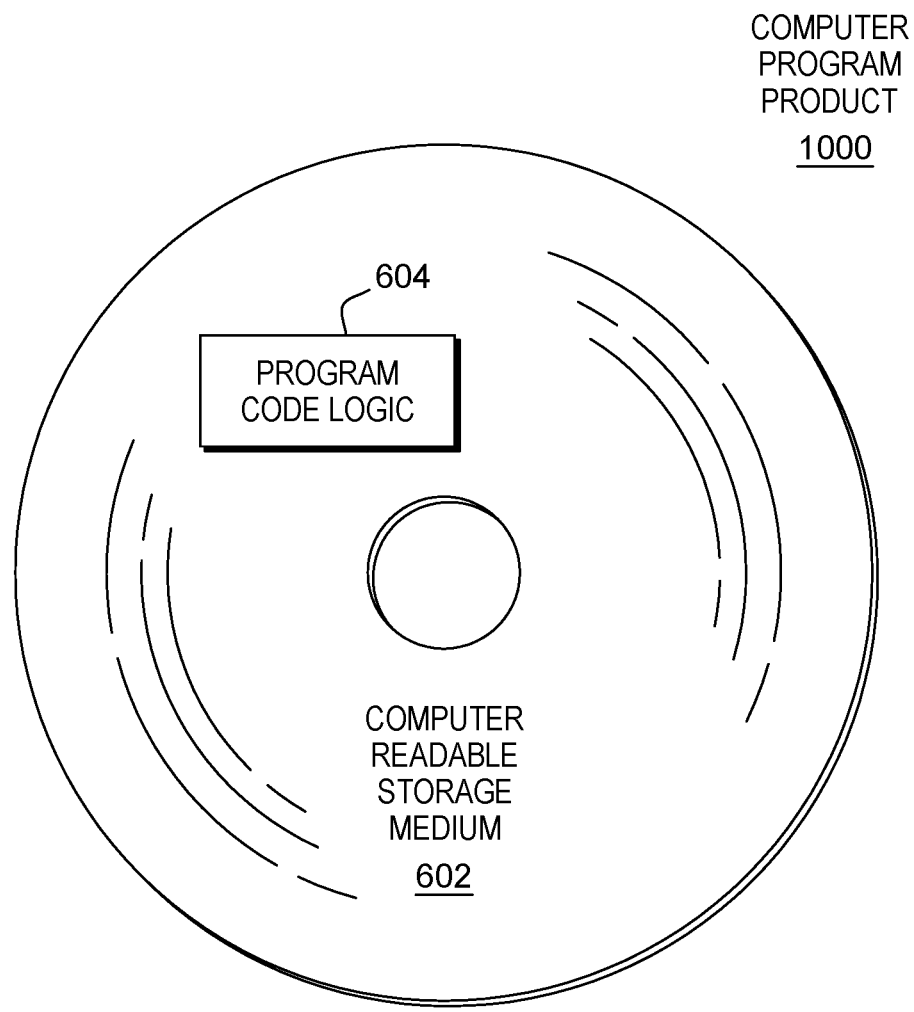
FIG. 10 depicts a computer program product incorporating one or more aspects of the present invention.

Using the processing resources of a resource 900 to execute software, computer-readable code or instructions, does not limit where this code can be stored. Referring to FIG. 10, in one example, a computer program product 1000 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object-oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples.

Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular uses contemplated.

The invention claimed is:

1. A computer-implemented method comprising:

obtaining, by one or more processors, a test to verify program code for deployment to one or more resources of a distributed computing system, wherein the test comprises one or more steps;

determining, by the one or more processors, based on comparing the one or more steps to pre-defined operations saved on at least one resource of the distributed computing system, one or more pre-defined operations correlating to the one or more steps, wherein each step of the one or more steps is a user-readable instruction and the one or more pre-defined operations correlating to the one or more steps comprise machine-readable instructions utilized by the at least one resource to execute each step of the one or more steps;

automatically generating, by the one or more processors, a distribution plan for executing the one or more pre-defined operations;

automatically distributing, by the one or more processors, based on the distribution plan, the one or more pre-defined operations to a portion of the one or more resources of the distributed computing system specified in the distribution plan, for execution on the portion of the one or more resources, where in the portion comprises one or more workstations and one or more servers;

monitoring, by the one or more processors, the execution of the one or more pre-defined operations on the portion of the one or more resources, wherein the monitoring comprises taking and saving at least one screenshot as each step of the one or more steps is executed by at least one resource of the portion of the one or more resources and obtaining feedback, wherein the feedback comprises results from the one or more pre-defined operations and feedback provided by users via a user interface generated by the one or more processors, wherein the feedback corresponds to the distribution plan and to substantive content of the one or more predefined operations;

generating, by the one or more processors, the user interface, wherein the user interface comprises a status indicator, a list of the one or more steps, a control to enable a user to pause each step of the one or more steps, and a visualization of health indicators of each portion of the one or more resources visualized contemporaneously with the one or more resources executing the one or more pre-defined operations, the visualization including an overview pane, a server pane having a plurality of server processes meters, and a workstation pane having a plurality of workstation processes meters, and the visualization including status information for the one or more workstations and the one or more servers executing one or more pre-define operations of the one or more pre-defined operations, and wherein the status information for the one or more workstations and the one or more servers comprises performance values for random-access memories and central processing units comprising the one or more workstations and the one or more servers;

continuously updating, by the one or more processors, the user interface, based on the monitoring, to reflect a progression of the portion of the one or more resources through the one or more steps in real-time; and automatically updating, by the one or more processors, the distribution plan, and substantive content of at least one of the one or more pre-defined operations based on the feedback;

wherein continuously updating further comprises:

indicating, by the one or more processors, in the user interface, a pass or a fail for each step of the one or more steps; and updating, by the one or more processors, the visualization of the health indicators to display adverse impacts of the test on an expected functionality of the respective resource; and generating, by the one or more processors, a visual to alert the user if a memory leak occurs.

2. The computer-implemented method of claim 1, further comprising:

generating, by the one or more processors, a log file, based on monitoring the execution of the one or more pre-defined operations on the portion of the one or more resources; and storing, by the one or more processors, the log file in a memory resource.

3. The computer-implemented method of claim 2, further comprising:

obtaining, by the one or more processors, via the user interface, a user selection of at least one item on the list of the one or more steps;

based on the user selection, querying, by the one or more processors, a database to access portions of the log file relevant to the user selection; and updating, by the one or more processors, the user interface, to reflect the portion of the log file relevant to the user selection.

4. The computer-implemented method of claim 3, wherein the portion of the log file relevant to the user selection is selected from the group consisting of:

results of executing at least one of the one or more pre-defined operations, a screenshot, and a graph illustrating performance of at least one resource of the distributed computing system.

5. The computer-implemented method of claim 1, further comprising:

obtaining, by the one or more processors, via the user interface, a user selection of at least one item on the list of the one or more steps; and opening, by the one or more processors, in a debugger, a portion the program code, based on the user selection.

6. The computer-implemented method of claim 1, further comprising:

determining, by the one or more processors, that the test is complete;

transmitting, by the one or more processors, a file comprising test results of the test to a pre-defined distribution list, wherein the test results comprise one or more of the screenshots.

7. The computer-implemented method of claim 1, wherein the test is selected from the group consisting of: a pending automated test and a valid automated test.

8. The computer-implemented method of claim 6, wherein the file comprising test results comprises items from the test, and wherein the test results are selected from the group consisting of: a scenario number, a unique resource identifier, iterations of a given step planned, iterations of the given step completed, a memory issue, a CPU issue, a disk issue, and a software issue.

9. The computer-implemented method of claim 1, further comprising:

automatically revising, by the one or more processors, certain operations of the one or more pre-defined operations, based on the monitoring; and updating, by the one or more processors, the interface to reflect the revising.

10. The method of claim 1, wherein automatically updating comprises a supervised and an unsupervised machine learning.

11. A computer program product comprising:

a non-transitory computer readable storage medium readable by one or more processors and storing instructions for execution by the one or more processors for performing a method comprising:

obtaining, by the one or more processors, a test to verify program code for deployment to one or more resources of a distributed computing system, wherein the test comprises one or more steps;

determining, by the one or more processors, based on comparing the one or more steps to pre-defined operations saved on at least one resource of the distributed computing system, one or more pre-defined operations correlating to the one or more steps, wherein each step of the one or more steps is a user-readable instruction and the one or more pre-defined operations correlating to the one or more steps comprise machine-readable instructions utilized by the at least one resource to execute each step of the one or more steps;

automatically generating, by the one or more processors, a distribution plan for executing the one or more pre-defined operations;

automatically distributing, by the one or more processors, based on the distribution plan, the one or more pre-defined operations to a portion of the one or more resources of the distributed computing system specified in the distribution plan, for execution on the portion of the one or more resources, wherein the portion comprises one or more workstations and one or more servers;

monitoring, by the one or more processors, the execution of the one or more pre-defined operations on the portion of the one or more resources, wherein the monitoring comprises taking and saving at least one screenshot as each step of the one or more steps is executed by at least one resource of the portion of the one or more resources and obtaining feedback, wherein the feedback comprises results from the one or more pre-defined operations and feedback provided by users via a user interface generated by the one or more processors, wherein the feedback corresponds to the distribution plan and to substantive content of the one or more predefined operations;

generating, by the one or more processors, the user interface, wherein the user interface comprises a status indicator, a list of the one or more steps, a control to enable a user to pause each step of the one or more steps, and a visualization of health indicators of the portion of the one or more resources visualized contemporaneously with the one or more resources executing the one or more pre-defined operations, the visualization including an overview pane, a server pane having a plurality of server processes meters, and a workstation pane having a plurality of workstation processes meters, and the visualization including status information for the one or more workstations and the one or more servers executing one or more pre-define operations of the one or more pre-defined operations, and wherein the status information for the one or more workstations and the one or more servers comprises performance values for random-access memories and central processing units comprising the one or more workstations and the one or more servers;

continuously updating, by the one or more processors, the user interface, based on the monitoring, to reflect a progression of the portion of the one or more resources through the one or more steps in real-time; and automatically updating, by the one or more processors, the distribution plan, and substantive content of at least one of the one or more pre-defined operations based on the feedback;

wherein continuously updating further comprises:

indicating, by the one or more processors, in the user interface, a pass or a fail for each step of the one or more steps;

updating, by the one or more processors, the visualization of the health indicators to display adverse impacts of the test on an expected functionality of the respective resource; and generating, by the one or more processors, a visual to alert the user if a memory leak occurs.

12. The computer program product of claim 11, wherein generating the user interface comprises:

displaying, by the one or more processors, the progression of the portion of the one or more resources through the one or more steps in a web browser.

13. The computer program product of claim 11, further comprising:

generating, by the one or more processors, a log file, based on monitoring the execution of the one or more pre-defined operations on the portion of the one or more resources; and storing, by the one or more processors, the log file in a memory resource.

14. The computer program product of claim 13, further comprising:

obtaining, by the one or more processors, via the user interface, a user selection of at least one item on the list of the one or more steps;

based on the user selection, querying, by the one or more processors, a database to access portions of the log file relevant to the user selection; and updating, by the one or more processors, the user interface, to reflect the portion of the log file relevant to the user selection.

15. The computer program product of claim 14, wherein the portion of the log file relevant to the user selection is selected from the group consisting of: results of executing at least one of the one or more pre-defined operations, a screenshot, and a graph illustrating performance of at least one resource of the distributed computing system.

16. The computer program product of claim 11, further comprising:

obtaining, by the one or more processors, via the user interface, a user selection of at least one item on the list of the one or more steps; and opening, by the one or more processors, in a debugger, a portion the program code, based on the user selection.

17. A system comprising:

a memory;

one or more processors in communication with the memory;

program instructions executable by the one or more processors via the memory to perform a method, the method comprising:

obtaining, by the one or more processors, a test to verify program code for deployment to one or more resources of a distributed computing system, wherein the test comprises one or more steps;

determining, by the one or more processors, based on comparing the one or more steps to pre-defined operations saved on at least one resource of the distributed computing system, one or more pre-defined operations correlating to the one or more steps, wherein each step of the one or more steps is a user-readable instruction and the one or more pre-defined operations correlating to the one or more steps comprise machine-readable instructions utilized by the at least one resource to execute each step of the one or more steps;

automatically generating, by the one or more processors, a distribution plan for executing the one or more pre-defined operations;

automatically distributing, by the one or more processors based on the distribution plan, the one or more pre-defined operations to a portion of the one or more resources of the distributed computing system specified in the distribution plan, for execution on the portion of the one or more resources, wherein the portion comprises one or more workstations and one or more servers;

monitoring, by the one or more processors, the execution of the one or more pre-defined operations on the portion of the one or more resources, wherein the monitoring comprises taking and saving at least one screenshot as each step of the one or more steps is executed by at least one resource of the portion of the one or more resources and obtaining feedback, wherein the feedback comprises results from the one or more pre-defined operations and feedback provided by users via a user interface generated by the one or more processors, wherein the feedback corresponds to the distribution plan and to substantive content of the one or more predefined operations;

generating, by the one or more processors, the user interface, wherein the user interface comprises a status indicator, a list of the one or more steps, a control to enable a user to pause each step of the one or more steps, and a visualization of health indicators of the portion of the one or more resources visualized contemporaneously with the one or more resources executing the one or more pre-defined operations, the visualization including an overview pane, a server pane having a plurality of server processes meters, and a workstation pane having a plurality of workstation processes meters, and the visualization including status information for the one or more workstations and the one or more servers executing one or more pre-define operations of the one or more pre-defined operations, and wherein the status information for the one or more workstations and the one or more servers comprises performance values for random-access memories and central processing units comprising the one or more workstations and the one or more servers;

continuously updating, by the one or more processors, the user interface, based on the monitoring, to reflect a progression of the portion of the one or more resources through the one or more steps in real-time; and automatically updating, by the one or more processors, the distribution plan, and substantive content of at least one of the one or more pre-defined operations based on the feedback;

wherein continuously updating further comprises:

indicating, by the one or more processors, in the user interface, a pass or a fail for each step of the one or more steps;

updating, by the one or more processors, the visualization of the health indicators to display adverse impacts of the test on an expected functionality of the respective resource; and generating, by the one or more processors, a visual to alert the user if a memory leak occurs.

* * * * *